(12) United States Patent
Nandagopal et al.

(10) Patent No.: US 9,571,454 B2
(45) Date of Patent: Feb. 14, 2017

(54) DYNAMIC RE-ORDERING OF SCANNING MODULES IN SECURITY DEVICES

(71) Applicant: Cisco Technology, Inc., San Jose, CA (US)

(72) Inventors: Vijay Nandagopal, Tamil Nadu (IN); Ranjiith Selvarajan, Bangalore (IN); Himanshu Minglani, Bangalore (IN); Sriram Gorti, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/576,811

(22) Filed: Dec. 19, 2014

(65) Prior Publication Data

US 2016/0182451 A1   Jun. 23, 2016

(51) Int. Cl.
*H04L 29/06*   (2006.01)

(52) U.S. Cl.
CPC ....... *H04L 63/0245* (2013.01); *H04L 63/1441* (2013.01)

(58) Field of Classification Search
CPC .. H04L 12/28; H04L 63/0218; H04L 63/0245; H04L 63/145; H04L 63/20; H04L 41/16; H04L 41/28; H04L 63/0272; H04L 63/164; H04N 1/04; H04N 1/00002; H04N 1/00018; H04N 1/00042; H04N 1/00047; H04N 1/00087; H04N 1/00063; H04N 1/00068; H04N 1/00076; H04N 1/00079; H04N 1/0005

USPC .......... 726/12, 15; 358/406, 448, 468, 1.14; 370/255

See application file for complete search history.

(56) References Cited

U.S. PATENT DOCUMENTS

| | | | |
|---|---|---|---|
| 7,706,004 B2* | 4/2010 | Prakash | H04N 1/00002 358/1.14 |
| 8,547,874 B2* | 10/2013 | Nandy | H04L 41/16 370/255 |
| 2014/0373129 A1* | 12/2014 | Li | H04L 63/0218 726/12 |

\* cited by examiner

*Primary Examiner* — Thanhnga B Truong
(74) *Attorney, Agent, or Firm* — Hickman Palermo Becker Bingham LLP

(57) ABSTRACT

A method and apparatus are provided for preserving bandwidth of a security gateway by dynamically placing a module with a highest ratio of block rate to run-time cost before other modules in the set of scanning modules such that a most effective scanning module blocks data units before scanning is wasted on those data units by other modules. By tracking a plurality of application data units that are sent through a set of scanning modules, a scanner history tracker records a rate with which the modules block application data units from forwarding to their intended destination. When the next period of application data units are received, a scanner driver re-orders the sequence of modules from highest block rate to lowest block rate such that some scanning modules are less likely to scan units that are likely to be blocked by other scanning modules.

20 Claims, 13 Drawing Sheets

901
Scanner Driver Logic

903
Compute Scanning Module's Cost Ratio (Time) in the Scanning Process

| 100 ms to scan a unit (50% of a pipeline scan) | 20 ms to scan a unit (10% pipeline scan) | 80 ms to scan a unit (40% pipeline scan) |
|---|---|---|
| Scanner A | Scanner B | Scanner C |

905
Record Units Blocked by Each Scanner Module During First Period

| 328 units | 91 units | 21 units |
|---|---|---|
| Scanner A | Scanner B | Scanner C |

907
Determine Scanning Modules Block Rate

| 328/.5 = 656 blocks/period | 91/.1 = 910 blocks/period | 21/.4 = 52.5 blocks/period |
|---|---|---|
| Scanner A | Scanner B | Scanner C |

909
Sort Scanning Modules by Block Rate for Next Period

| 910 blocks/period | > | 656 blocks/period | > | 52.5 blocks/period |
|---|---|---|---|---|
| Scanner B | | Scanner A | | Scanner C |

FIG. 9

1001
Effort Calculations

---

1003
Units blocked in Sequence 2 during Period 2

| 95 units | 413 units | 18 units |
|---|---|---|
| Scanner B | Scanner A | Scanner C |

---

1005
Based on the order, some units went through more scanners

- 18 units went through Scanner B, Scanner A, & Scanner C
- 413 units went through Scanner B & Scanner A
- 95 units went through Scanner B

---

1007
Calculate Total Effort using Sequence 2 for Period 2

- $(18 \times 0.1) + (18 \times 0.5) + (18 \times 0.4)$ = 18
- $(413 \times 0.1) + (413 \times 0.5)$ = 248
- $(95 \times 0.1)$ = 10

$\qquad\qquad\qquad\qquad\qquad\qquad\qquad\qquad$ 276

---

1009
Calculate Wasted Effort using user defined weights
For example: (Scanner B = 0.2) (Scanner A = 1) (Scanner C = 0.8)

- Scanner B $(18 \times 0.2)$ + Scanner A $(18 \times 1)$ = 21
- Scanner B $(413 \times 0.2)$ = 83

$\qquad\qquad\qquad\qquad\qquad\qquad\qquad\qquad$ 104

FIG. 10

1101
Effort Example Comparison

1103
Units Caught using Sequence 1 during Period 2

| 413 units | 95 units | 18 units |

Scanner A        Scanner B        Scanner C

1105
Based on the order, some units went through more scanners

- 18 units went through Scanner A, Scanner B, & Scanner C
- 95 units went through Scanner A & Scanner B
- 413 units went through Scanner A

1107
Calculate Total Effort using Sequence 1 for Period 2

- $(18 \times 0.5) + (18 \times 0.1) + (18 \times 0.4)$ = 18
- $(95 \times 0.5) + (95 \times 0.1)$ = 57
- $(413 \times 0.5)$ = 207
    -----------------
    282

FIG. 11

1109
Calculate Wasted Effort using user defined weights
For example: (Scanner A = 1) (Scanner B = .2) (Scanner C = .8)

- Scanner A $(18 \times 1)$ + Scanner B $(18 \times .2)$ = 21
- Scanner A $(95 \times 1)$ = 95
    -----------------
    116

1201
Wasted Effort (WE) Comparison

| | Static Module Order | | | | Variable Module Order | | | |
|---|---|---|---|---|---|---|---|---|
| Line | S1 | S2 | S3 | WE | ~ | ~ | ~ | WE |
| 1 | 386 | 73 | 8 | 82 | 386 | 73 | 8 | 82 |
| 2 | 328 | 91 | 21 | 116 | 328 | 91 | 21 | 116 |
| 3 | 413 | 95 | 18 | 116 | 95 | 413 | 18 | 104 |
| 4 | 357 | 67 | 10 | 79 | 67 | 357 | 10 | 83 |
| 5 | 428 | 100 | 14 | 116 | 428 | 100 | 14 | 116 |
| 6 | 397 | 110 | 13 | 125 | 110 | 397 | 13 | 95 |
| 7 | 427 | 85 | 23 | 112 | 85 | 427 | 23 | 113 |
| 8 | 464 | 114 | 12 | 128 | 464 | 114 | 12 | 128 |
| 9 | 401 | 61 | 11 | 74 | 61 | 401 | 11 | 93 |
| 10 | 428 | 109 | 13 | 124 | 428 | 109 | 13 | 124 |
| 11 | 116 | 387 | 21 | 412 | 387 | 116 | 21 | 48 |
| 12 | 101 | 400 | 7 | 408 | 400 | 101 | 7 | 28 |
| 13 | 62 | 360 | 18 | 381 | 360 | 62 | 18 | 34 |
| 14 | 77 | 319 | 12 | 333 | 319 | 77 | 12 | 29 |
| 15 | 72 | 303 | 10 | 315 | 303 | 72 | 10 | 26 |
| 16 | 105 | 309 | 17 | 329 | 309 | 105 | 17 | 41 |
| 17 | 98 | 483 | 16 | 502 | 483 | 98 | 16 | 38 |
| 18 | 76 | 394 | 9 | 404 | 394 | 76 | 9 | 26 |
| 19 | 107 | 418 | 9 | 428 | 418 | 107 | 9 | 32 |
| 20 | 79 | 445 | 25 | 475 | 445 | 79 | 25 | 45 |
| 21 | 384 | 70 | 18 | 91 | 70 | 384 | 18 | 98 |
| 22 | 372 | 84 | 5 | 90 | 372 | 84 | 5 | 90 |
| 23 | 413 | 67 | 20 | 91 | 67 | 413 | 20 | 106 |
| 24 | 395 | 67 | 17 | 87 | 395 | 67 | 17 | 87 |
| 25 | 467 | 117 | 21 | 142 | 467 | 117 | 21 | 142 |
| 26 | 371 | 69 | 9 | 79 | 69 | 371 | 9 | 85 |
| 27 | 445 | 65 | 20 | 89 | 445 | 65 | 20 | 89 |
| 28 | 467 | 120 | 17 | 140 | 467 | 120 | 17 | 140 |
| 29 | 344 | 93 | 23 | 120 | 93 | 344 | 23 | 96 |

DYNAMIC RE-ORDERING OF SCANNING MODULES IN SECURITY DEVICES

FIELD OF THE DISCLOSURE

The present disclosure relates to network security devices. The disclosure relates more specifically to improved computer-implemented techniques relating to using scanning modules in security devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Security gateways are used by a variety of organizations to protect their networks, internal users, and assets. A typical gateway consists of various scanning modules that are placed in a threat detection pipeline to filter out undesirable network data. An example of a threat detection pipeline includes a spam detection scanning module and an antivirus scanning module placed in a sequence.

The sequence of a threat detection pipeline is determined by system designers based on their knowledge of the network or domain that is protected. Once a system designer determines a sequence of scanners, the system is static. However, the threat landscape is continually evolving with new vulnerabilities being found in different software systems. Cyber criminals tend to gravitate towards these new vulnerabilities because they have a higher yield compared to old vulnerabilities. Thus, even if a module in a threat detection pipeline is able to identify a new threat exploiting these vulnerabilities, the security gateway must still account for large surges in traffic that attempt to capitalize on the new vulnerabilities.

One approach to handling surges of attacks is to update a module based on a new threat. For example, an email security appliance could add a new definition to an existing module. However, security devices cannot afford to stop looking for older threats, because internal systems may not have been upgraded against those vulnerabilities. So, even when new threats are being found, security devices continue to process payloads against a growing, static order of scanning modules. This approach is sub-optimal when a certain type of attack is placed on the system that is easily filtered out by one scanning module, but must go through many other scanning modules first. A significant number of cycles may be wasted on processing multiple data units before they are blocked. The results being that the gateway is overworked without much benefit.

Another approach to handling attacks is to define multiple threat detection pipelines called policies, where each policy includes a group of scanning modules. The benefit here is that some scanning modules may be bypassed in the security threat pipeline according to the rule set of the policy. For example, using an email security appliance (ESA), a policy classifier may look at the sender of an email and determine that such a sender is unlikely to mail spam. Thus, the gateway chooses a threat policy that does not include a spam filter. A setback of this approach is the requirement of knowledge regarding the application level data before going through the pipeline process. In addition, certain attacks will still be processed in a sub-optimal manner. For example, if an email address is known to forward both useful files and files containing spam, viruses, and malware, the ESA must continually send all data to a policy that has those three scanning modules using a predefined order. If there is a surge in traffic that includes a new threat that is detectable by the third module in the scanning order, the ESA continues to process the mail through the first two modules as well. For example, a current surge in mail may include spyware but not include detectable spam or viruses. The first two scanners use up "valuable" processing cycles scanning for spam and viruses, even though the mail is eventually discarded by a third anti-spyware scanning module.

BRIEF DESCRIPTION OF THE DRAWINGS

In the drawings:

FIG. 9 is a flowchart illustrating the scanner driver's logic in determining a scanner module order.

FIG. 10 is a flowchart illustrating steps for performing effort calculations for a dynamically ordered threat detection pipeline.

FIG. 11 is a flowchart illustrating steps for performing an effort calculation for a statically ordered threat detection pipeline.

FIG. 12 comprises a chart used as an example for comparing a statically ordered threat detection pipeline with a dynamically ordered threat detection pipeline.

DETAILED DESCRIPTION

Figure 1:
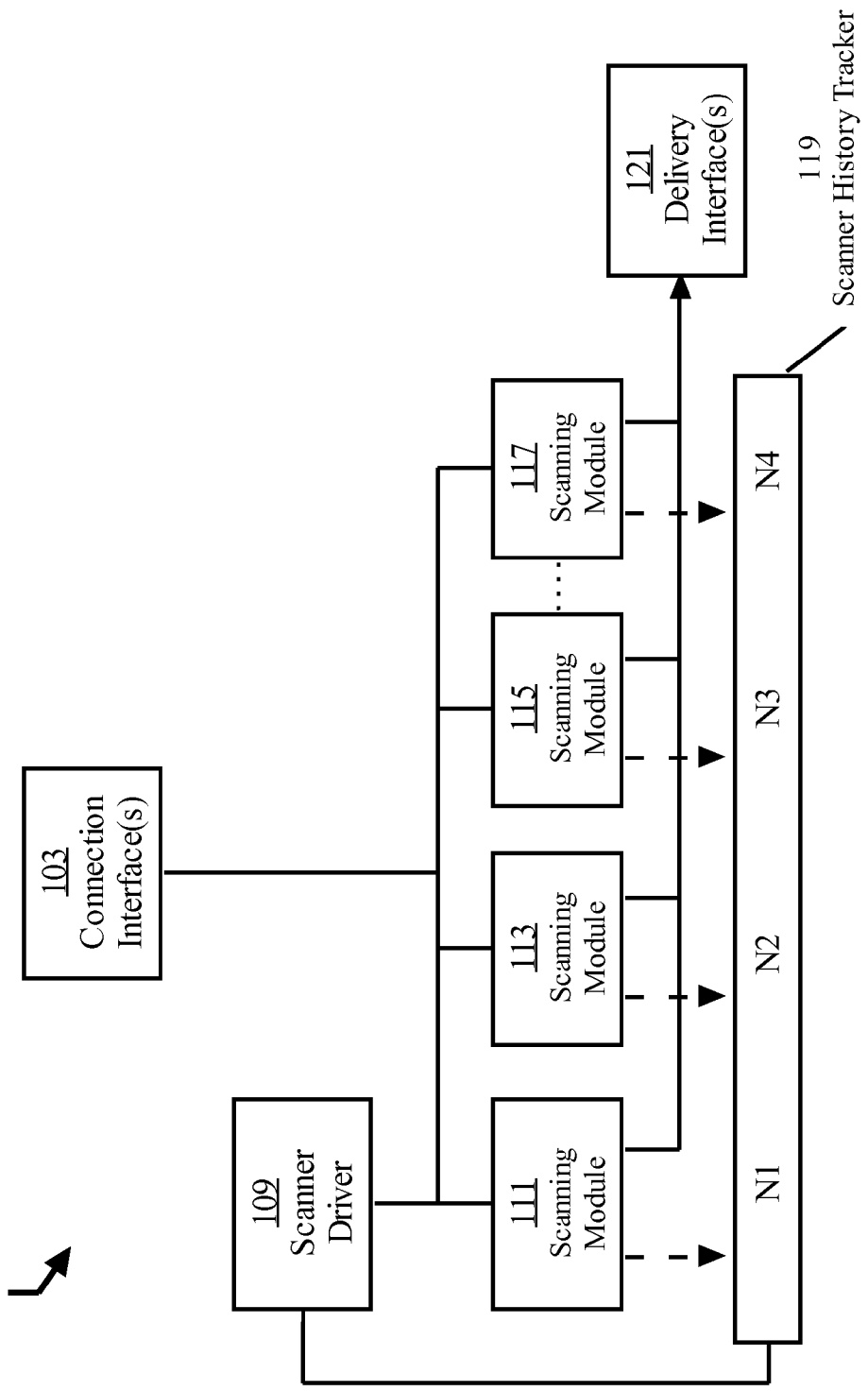
FIG. 1 is a block diagram illustrating a gateway system architecture.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In some embodiments, an application level firewall is configured to preserve the data transmission bandwidth of a gateway by dynamically re-ordering scanning modules that scan and block application data units (ADUs). In one approach, scanning modules with a more efficient block rate are placed earlier in a scanning sequence, so they efficiently block (ADUs) before they are passed on to the slower modules. The gateway may comprise a connection interface, a scanner history tracker, a scanner driver, and a plurality of scanning modules such as spam filters and antivirus software. By tracking the application data units that are sent through the set of scanning modules, the scanner history tracker records a rate that each module blocks application data units from forwarding to their intended destination. When the next few application data units are received, a scanner driver re-orders the sequence of modules from highest block rate to lowest block rate such that less overall work needs to be performed by all scanning modules in the gateway.

In some embodiments, the gateway is integrated with other security appliances such as a policy classifier and a reputation repository. For example, the application data units may be routed through a set group of scanning modules according to a rule set known as a policy. Additionally, metadata is added to each application data unit for use by the scanning modules and the scanner driver. The scanner driver dynamically changes the module scanning sequence based on a block rate recorded by the scanner history tracker and additional variables stored in the metadata such as scanning module run-time efficiency weights, policy specific scanning orders, user defined scanning orders, and reputation information derived from the sender's IP address or the application level addresses and domains associated with the application data units.

Certain embodiments are described in the context of an email security appliance having a plurality of scanning modules. However, embodiments also may be implemented in the context of an application level gateway configured for sending and receiving data through a multi-layered protocol and scanning application level data units for content under a particular protocol. Other embodiments may be implemented using application aware firewalls, intrusion prevention systems, web application firewalls, gateways from monitoring data transfer over remote connection, or scanning modules that are chained for scanning data in a cloud environment.

Each of the functional units that is described herein in block diagram form may be implemented, in various embodiments, using one or more computer programs, other software elements, firmware, hardware logic such as FPGAs or ASICs, or a combination thereof. These elements may be combined in a special-purpose computer system that is configured as shown in one or more of the drawing figures. Alternatively, the elements may be implemented as stored programs that are loaded into a general-purpose computer system and, when loaded and hosted or executed, transform the general-purpose computer system into a special-purpose computer system that is configured as described herein. The flow diagrams are intended to provide baseline information for use in preparing computer programs or other logic that is configured to perform the steps and functions shown in the flow diagrams, using any suitable programming language (e.g., Java, C, C++, Objective-C, etc.) or definition language, encoder or burner for circuits such as FPGAs or ASICs.

Example Scanner Driver Hardware

In some embodiments, the scanner driver is part of a special purpose gateway server. The server is placed as a standalone appliance on the edge of a local network or data center. In some embodiments, the scanner driver is part of a special purpose blade for installing in a switch, hub, router, server, or other network device. In these embodiments, multiple blades may be employed on a single device, where each gate operates independently with its own set of data interfaces. In some embodiments, the scanner driver is part of a virtual instance that is employed on an edge appliance managing a plurality of networked scanner modules.

In some embodiments the scanning modules are placed on a single device with the scanner driver. In other embodiments, the system is in a distributed computing environment where tasks are performed by remote processing devices that are linked through a communications network. In a distributed computing environment, scanning modules may be located in both local and remote systems. For example, the scanner driver may be physically located locally, while scanning modules are located in a cloud environment. When modules are being employed as virtual machine services, additional monitors may need to be added to the system to track units blocked in a service chaining operation. These monitors forward blocking information to one or more centralized scanner history trackers. Additionally, the scanner driver may be employed at the hypervisor level if scanning modules are implemented as virtual machines.

Example Gateway System Architecture

FIG. 1 is a block diagram illustrating a gateway system architecture. In one embodiment, a gateway system architecture 101 comprises one or more connection interfaces 103 coupled to scanning modules 111, 113, 115, 117 and a scanner driver 109. The scanner driver 109 also is coupled to each of the scanning modules. The scanning modules 111, 113, 115, 117 further comprise an output that is coupled to one or more delivery interfaces 121 and a second output that is coupled to a scanner history tracker 119, which may be configured as a tap with respect to the scanning modules. Scanner driver 109 also is coupled to the scanner history tracker 119.

In some embodiments, a gateway, such as a firewall employed in a special purpose network device, blade, or host machine, filters traffic by routing network traffic through a plurality of scanning modules before forwarding the units to a specified destination. For example, in FIG. 1 incoming data is received by one or more connection interfaces and put through scanning modules 111 through 117 before being sent to a delivery interface 121.

At least some of these units may be received by a scanning module and not forwarded toward the destination specified in those units. This blocking information may be recorded by the scanner history tracker 119 that records the number of units blocked by each module over a period. A blocked unit may be defined as a unit received by a module 111, 113, 115, 117 in the set and not forwarded toward the destination specified in that unit. For example, data received by scanning module 111 and not forwarded to scanning module 113 is a blocked unit. The scanner history tracker 119 creates and stores tally data that indicates the blocked unit as blocked by scanning module 111.

Using the tally data from the scanner history tracker 119, a scanner driver may dynamically order the sequence with which a single data unit is scanned by multiple scanning modules 111, 113, 115, 117. Modules with an immediate history of blocking large numbers of data units efficiently are moved to the front of the scanning sequence. The scanning module with the highest block rate then blocks data units efficiently, so those units need not be processed by other module in the set, which preserves bandwidth of the overall gateway system.

For example, assume an email security appliance has a threat detection pipeline with three scanning modules. The pipeline has an overall throughput of 100 bytes/sec. If an application data unit that comprises 20 bytes is blocked by the first scanning module in the sequence rather than the second or third, then more than 80 bytes may still be processed by the pipeline before an entire second has lapsed, because the 20 bytes were not processed by the other two modules in the threat detection pipeline.

Scanner History Tracker

In some embodiments, the scanner history tracker 119 counts, in periods, the number of application data units that are received by each module in a set of scanning modules 111, 113, 115, 117 and not forwarded toward a destination specified in those units.

For example, assume an email security appliance processes application data units such as email messages from a sender to receiver. The email messages are placed in a threat detection pipeline comprising a spam filter, an antivirus scanner, and an anti-malware scanner. When the spam filter receives an email message containing spam, rather than forwarding the spam, the spam filter sends an increment request to the scanner history tracker. The scanner history tracker then increments a counter related to the spam filter. When the next message makes it through the spam filter, but is blocked by the anti-malware scanner, the anti-malware scanner similarly pings the scanner history tracker, and the scanner history tracker increments a counter associated with the anti-malware scanner. This process continues for a fixed period. At the end of the period, the scanner history tracker has a rate for the amount of units blocked by each scanning module over that period.

Scanning History Period

In some embodiments, the scanner history tracker 119 counts a number of units blocked by each module 111, 113, 115, 117 over a period. This period may comprise a time period, a threshold number of total units placed into a security detection pipeline, or a threshold aggregate number of units blocked by all scanning modules 111, 113, 115, 117 in the security detection pipeline. In some embodiments, the period is derived from the number of cycles executed by a processor. In some embodiments, the period is derived from the number of cycles executed by a processor executing instructions specifically for the scanning modules.

Scanner Driver

In some embodiments, the scanner driver 109 automatically orders the module scanning sequence of the security threat pipeline by altering the forwarding mechanism with which a security threat pipeline sends messages between scanning modules 111, 113, 115, 117. For example, scanning module 111, which is set to forward to scanning module 113 may be altered to instead forward to scanning module 115.

In other embodiments, the scanner driver 109 may be configured as a scanner sequencer to alter data units by adding metadata to each unit regarding the order the unit is to be scanned. In this embodiment, the scanner driver 109 adds header information of the data unit processing path to the ADU. For example, a first ADU has forwarding information added to its header stating that it should be sent to modules 111, 113, 115 in that order. After Module 111 scans the ADU, the module erases the 'module 111' destination from packet's header information. Then, the packet is sent to module 113 with destinations of modules 113, 115 in the header information. Module 113 scans and erases the 'module 113' destination value from the header and sends the ADU on to module 115. Once module 115 scans the ADU, the ADU is passed on for queuing for delivery.

In some embodiments, where the scanner driver 109 is adding header information on data units, it may be integrated with one or more other gateway elements that also process data units, such as a policy classifier. For example, in an integrated system the policy classifier opens the unit, defines a policy for the unit, and then adds header information derived from a scanner history tracker to define a scanning order as well.

Scanner Driver and Scanner History Tracker Interplay

Figure 2:
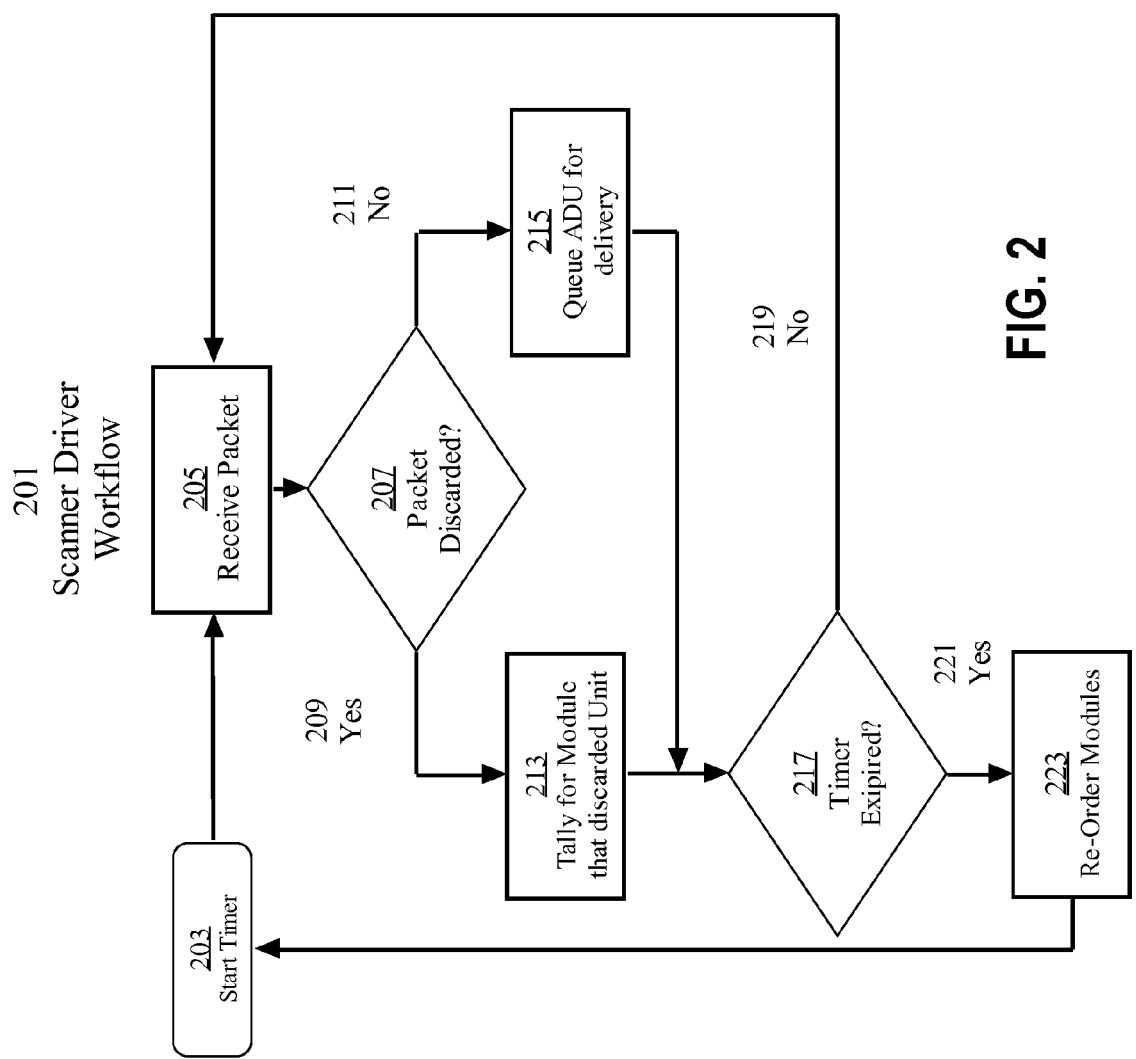
FIG. 2 is a flowchart illustrating a scanner driver workflow for a gateway system.

FIG. 2 is a flowchart illustrating a scanner driver workflow for a gateway system. In some embodiments, the scanner driver 109 computes a scanning order based on a rate recorded by the scanner history tracker for each scanning module. As presented in FIG. 2, at block 203 the scanner history tracker 119 starts a timer associated with a threshold value. Alternatively, a counter may be used. At block 205, a security threat pipeline receives a data unit.

At block 207, the data unit is forwarded from one security module to the next until one of two actions occurs, as indicated by the test of block 207. If the data unit was blocked by a particular module as seen at path 209, then at block 213 a counter is incremented for that particular module in the scanner history tracker. If a data unit successfully passes through the pipeline as shown by path 211, then at block 215 the data unit is queued for delivery.

Block 217 comprises a test of whether the timer expired. If the timer continues to run as seen at path 219, then control transfers to block 205 and the next data unit is received and the process is repeated. If the timer has expired as seen at path 221, then at block 223 the driver re-orders the modules such that the highest rate module is placed at the front of the security threat pipeline, and the timer is reset.

In this embodiment, a timer is used, but in other embodiments, a counter is used where the counter resets after meeting a threshold number of units causing a re-ordering of modules at block 223.

Additional Gateway Architecture

Figure 3:
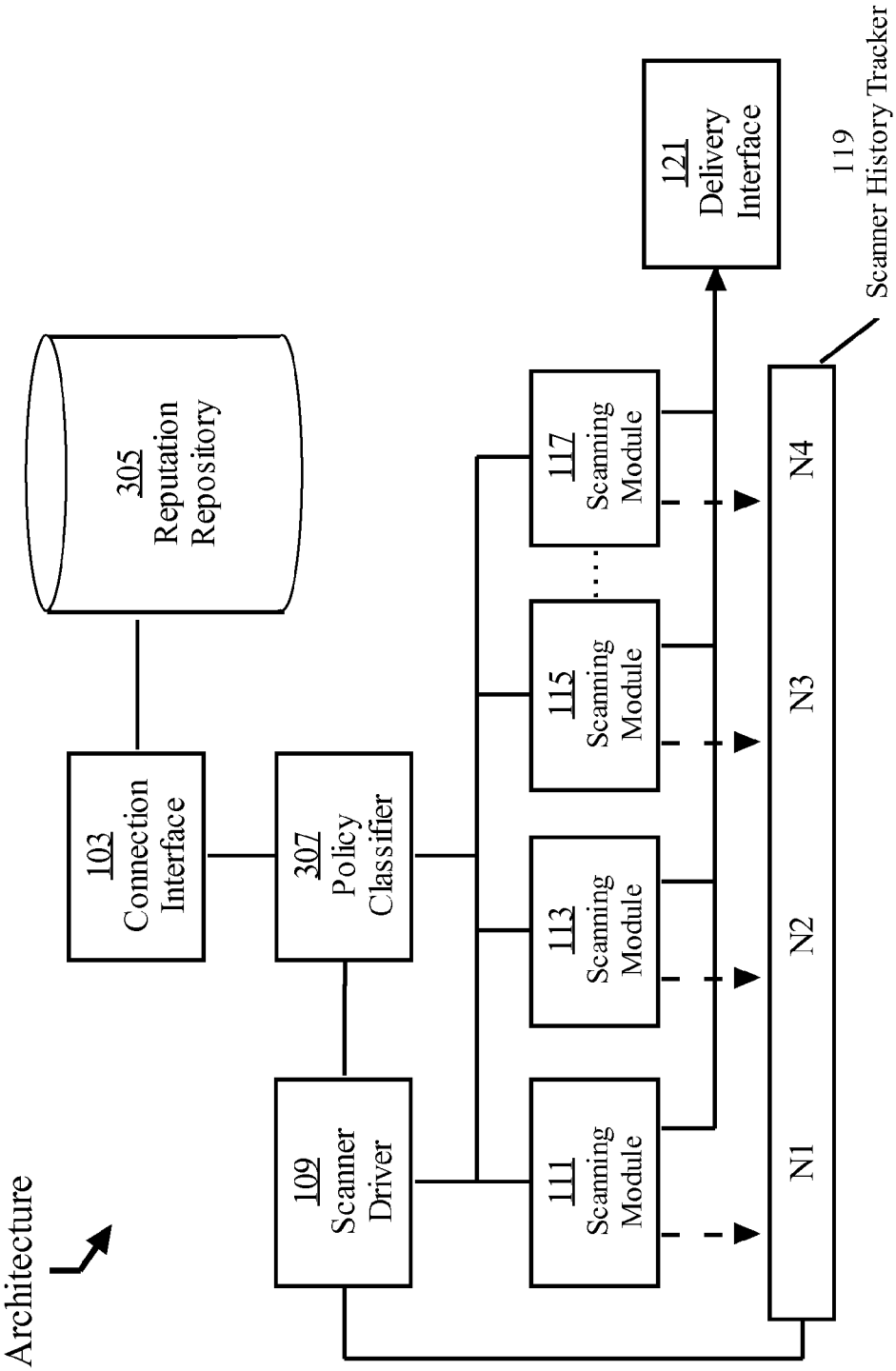
FIG. 3 is a block diagram illustrating a gateway system architecture with additional gateway security elements.

In some embodiments, the scanner driver and scanner history tracker are integrated with one or more security gateway elements. For example, FIG. 3 is a block diagram illustrating a gateway system architecture. In one embodiment, a gateway system architecture 301 comprises one or more connection interfaces 103 coupled to a reputation repository 305 and a policy classifier 307. The policy classifier 307 also couples to scanning modules 111, 113, 115, 117 and a scanner driver 109. The scanner driver 109 also is coupled to each of the scanning modules. The scanning modules 111, 113, 115, 117 further comprise an output that is coupled to one or more delivery interfaces 121 and a second output that is coupled to a scanner history tracker 119, which may be configured as a tap with respect to the scanning modules. Scanner driver 109 also is coupled to the scanner history tracker 119.

A. Connection Interface

In some embodiments, one or more connection interfaces 103 accept a TCP/IP or UDP connection and receive packets from that connection. In some embodiments this further involves reconstructing the packets into application level data units before forwarding the information on through a scanning module pipeline. For example, in an email security appliance, an SMTP server uses a TCP port and a standard IP address to receive data packets from other servers. The packets are reconstructed into an application data unit.

In some embodiments, the connection interface 103 extracts information from the incoming connection for identifying a security posture for the connection. This information may include IP address, application level sender and receiver information, file type, MIME types, or specific content within the data unit. If the security posture indicates that the connection is a threat or spam, the connection is dropped. If the security posture does not indicate an immediate threat, extra information regarding the security posture may be added to the application data unit as metadata.

B. Reputation Repository

Security posture information may be stored internally in the gateway system, externally in a reputation repository, or in a combination of internal and external repositories. For example, in FIG. 3 when a connection interface 103 receives a connection, the interface 103 module accesses a reputation repository 305 to determine security posture information regarding that connection.

In some embodiments, the system may contact an external repository 305 to define a reputation level of the sender of an email. The sender of an email may be defined by the IP address of the sender or the email address of the sender. The reputation repository 305 sends back a real number constrained between negative ten and positive ten. A negative ten reputation indicates an extremely bad reputation requiring extensive scanning by each scanning module 111, 113, 115, 117, while a positive ten reputation indicates an extremely good reputation with minimal scanning required.

In some embodiments, the gateway system may then add this information as metadata to the application data unit. Later in the gateway process, the scanning modules 111, 113, 115, 117 interpret this reputation level to define the comprehensiveness of a scan. For example, assume an anti-spam filter is scanning an email message that has be tagged with a "−8" reputation element as metadata. The low reputation value may indicate that more keywords should be compared against the content of an email to qualify the email as spam. The spam filter is then more likely to block the message from being forwarded to its recipient.

In some embodiments, security posture metadata may be added to augment a policy defined by the policy classifier, such as adding or deleting a scanning module from the security threat pipeline. In some embodiments, administrator defined metadata may be added to define a sequence of scanning modules in the security threat pipeline. For example, a system administrator or security organization may encounter an attack in the form of malware. In this case, the system administrator or security organization may temporarily change the scanning order of all policies such that the anti-malware scanning module is first. In some embodiments, security posture metadata may be added to define a user specific policy or sequence. For example, if a known sender is attempting to send an email that is continually blocked by the security threat pipeline, the recipient may wish to bypass the security threat pipeline for that particular email without turning off the email gateway for other emails. In such a case, a bypass tag may be added as a security posture through the reputation repository 305, such that an email from the known sender will have bypass metadata added to the ADUs.

C. Policy Classifier

The policy classifier 307 identifies sender and recipient information to determine a group of scanning modules for the security threat pipeline. The policy classifier 307 may have a list of different senders and receivers classified in different groups called policies. For example, an email policy classifier may have three policies comprising engineers classified in an engineering group, office administrators classified in an office group, and sales associates classified in a sales group. Because the sales associates are more likely to receive a lot of external mail, the scanning policy for these email addresses will include a larger number of scanning modules than the other two groups.

Additionally, a policy classifier may group senders. For example, email policies may comprise a list of sender domains. A particular domain may be notorious for forwarding spam email to the engineering group. In this case, senders with that domain are placed in a fourth group with a policy that includes a spam filter, but excludes other modules because the engineers are more likely to need all of the information in a file if the file makes it through the spam filter.

D. Scanning Modules

Scanning modules 111, 113, 115, 117 include, but are not limited to, spam filters, antivirus, antispyware, and anti-malware engines, user block lists, email fraud scanners, packet filters, stateful filters, user identity integration, denial of service mitigation modules, cross-site scripting (XSS) detection, SQL injection detection, image analysis engines, and data loss prevention engines, and user defined filters.

A spam filter detects unsolicited and unwanted electronic messages and prevents those messages from getting to the recipient. Simple spam filters may review the subject line or first line of messages. More advanced spam filters use pattern recognition within the content of the message to detect spam. Pattern recognition may include Bayesian logic that incorporates user feedback to recognize substitute characters that should have been filtered as spam. Spam filters may also be tailored to filter out scams. For example, a Bayesian logic spam filter that filters scams will filter both "CLICK FOR MONEY" and "CL!CK F0R $$$".

An antivirus engine (AV engine) scans for computer viruses. A virus, when executed, replicates by inserting copies of itself into other parts of the computer system, such as other files, programs, or boot operations, so as to again self-replicate. Modern antivirus engine terminology may be grouped and muddled with various anti-malware and anti-spyware scanning modules. Therefore, any scanning modules that scan for software that disrupts computer operation or gathers sensitive information may be considered an anti-virus scanning module, an anti-malware scanning module, or an anti-spyware scanning module. A non-exhaustive list of the various scanning modules that may fall in this category include, but are not limited to, scanning modules that search for (1) layered service providers (LSPs) that insert themselves into the TCP/IP protocol stack to modify inbound and outbound traffic; (2) browser hijackers that change browser settings such as homepages and search engines without permission; (3) malicious plug-ins and add-ons for existing software and particularly browsers; (4) key loggers; (5) ransomware that restricts access or encrypts a computer system until a ransom is paid; (6) rootkits that grant administrator privileges to a computer or network; (7) trojans that act as a benign program but execute additional malicious code; (8) worms that act as standalone programs that replicate themselves across a computer system or network, (9) backdoors that bypass normal authentication requirements, (10) fraudtools that act as a known program but execute as malicious code; (11) adware that automatically renders advertisements; (12) spyware that aggregates information about browsing habits, computer usage, and browser cookies to send to a third party; (13) malicious URLs; (14) phishing that attempts to acquire sensitive information such as username, passwords, and credit card details by masquerading as a trustworthy entity; (15) social engineering techniques by exhibiting specific known information to gain more sensitive information about a person or organization; and (16) bots that implement distributed denial of service attacks.

Packet filter scanning modules inspect data units such as frames, packets, or segments that are transferred between computers on the Internet. If a data unit matches the packet filter's set of filtering rules, the packet filter does not forward the packet to its intended destination and sends error responses to the source that is attempting to send the data unit.

Stateful filter scanning modules inspect data units such as frames, packets, or segments that are transferred between computers on the Internet via a connection. If a data unit matches the stateful filter's set of filtering rules, the stateful filter does not forward, the data unit, and drops the connection. In addition, stateful filters recognize that some data units are more likely to be legitimate traffic, so such data units are less likely to be dropped.

A user identity integration module maps a user, username, or other information about a user to their IP address. These modules may also include forwarding and redirecting software.

Denial of service (DDoS) mitigation modules are scanning modules that follow IP reputation and behavior-based detection to filter out traffic meant to overload a network.

Scanning modules that prevent Cross-Site Scripting (XSS) check for malicious scripts that are injected into otherwise benign and trusted web sites. For example, a website that uses URL tokens to define links can be exploited by XSS by changing these URL tokens to make a website direct the links to other websites.

Scanning modules that prevent SQL injection check for scripts that add additional database commands to commands received from a website that sends database commands. These malicious commands may include shutting down a DBMS, dropping tables, or otherwise modifying database objects in an unexpected way.

Image Analysis Engines may be used to prevent messages with unwanted images from being sent to the intended recipient. For example, a form of spam involves embedding text within images to hide the content of the spam from a normal scan performed by a spam filter. Such engines may include normalization techniques as well as OCR technology as well.

A Data Loss Prevention Engine (DLP Engine) may be used to prevent confidential data from being sent outside a network. This data may be leaked through malicious intent or inadvertent mistake, but typically should not be sent outside a network using a messaging system such as email. For example, credit card information may be prevented from leaving the network; confidential unencrypted data may be prevented from leaving the network; or even fingerprint data may be prevented from leaving the network.

User defined filters are for an additional layer of filtering that may prevent specific users from accessing certain websites or censor unwanted content. A user defined filter is not limited to a user, but may be implemented by an organization for a set of users, or a system administrator for some or all users on a network.

E. Delivery Interface

In some embodiments, a delivery interface 121 sends data units to a destination computer or server. For example, in an email security appliance, the delivery interface 121 may send incoming emails to local inboxes for display to their respective users. For outgoing mail, the delivery interface 121 may send local email out to an external SMTP server. For some embodiments, the connection interface 103 and the delivery interface 121 are the same physical pieces of hardware. In some embodiments, the connection interface 103 and the delivery interface 121 are different physical elements.

Policy Specific Layout

Figure 4:
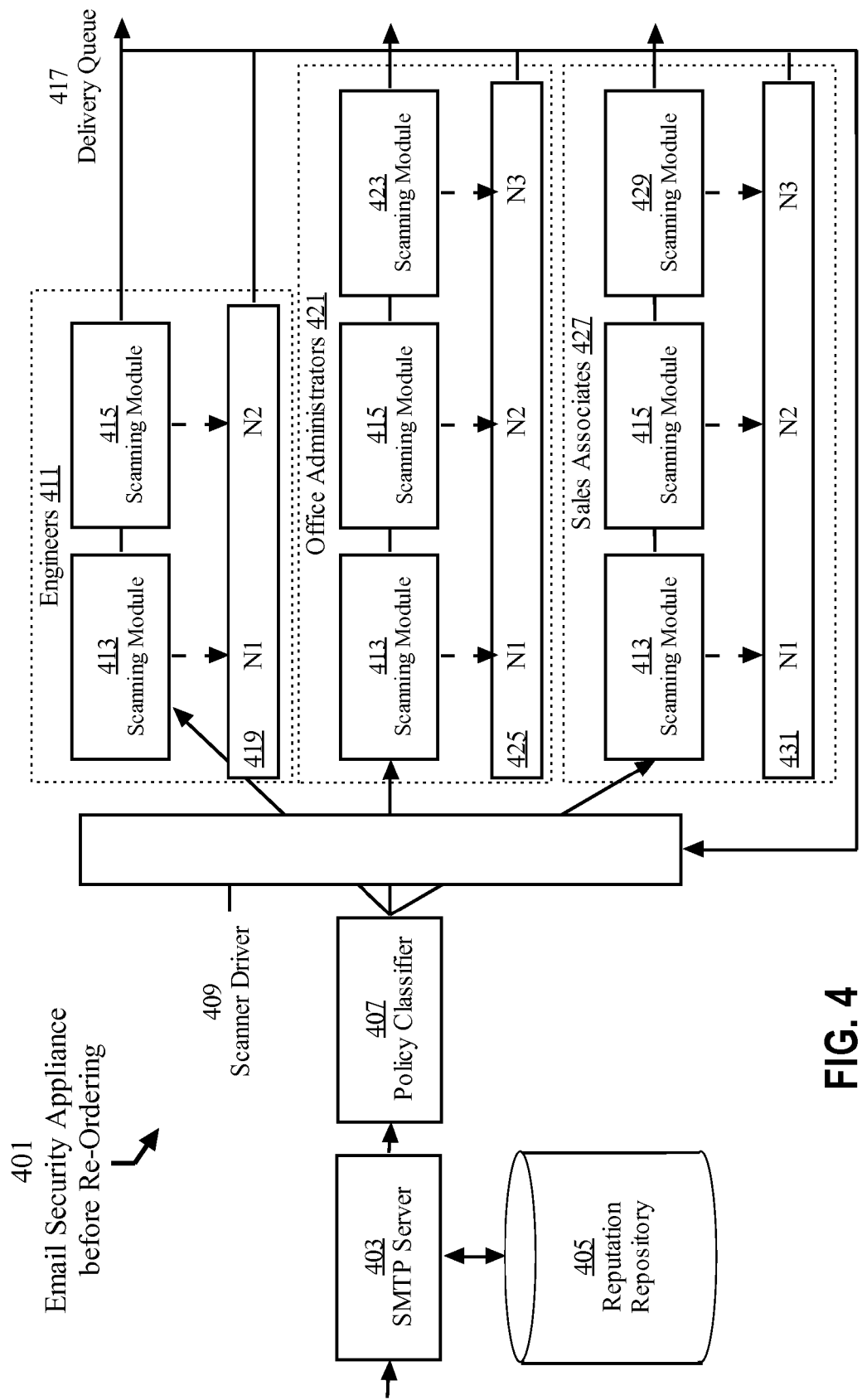
FIG. 4 is a block diagram illustrating an email security appliance gateway system with a scanner history tracker for each policy.

FIG. 4 is a block diagram illustrating an email security appliance gateway system with a scanner history tracker for each policy. The security appliance gateway comprises an SMTP server 403 coupled to a reputation repository 405 and a policy classifier 407. The policy classifier is coupled to a plurality of scanning modules 413, 415, 423, and 429 that are controlled by a scanner driver 409. The scanning modules are grouped in different sets called policies. A policy is defined for engineers 411, office administrators 421, and sales associates 427. Although the scanning modules in some policies are similar, the same module pushes information to a different scanner history tracker depending on the active policy. For example, scanning module 413 pushes to scanning history tracker 419 when being used in the policy for engineers 411. Scanning module 413 pushes to scanning history tracker 425 when being used in the policy for office administrators 421. Scanning module 413 pushes to scanning history tracker 431 when being used in the policy for sale associates 427.

In some embodiments, a different scanner history tracker is created for each policy. In this manner, the scanner driver may independently determine a sequence of scanning modules even if some policies have overlapping use of the same scanning modules.

For example, FIG. 4 illustrates three policies for scanning email messages: a policy for engineers receiving mail 411, a policy for office administrators receiving mail 421, and a policy for sales associates 427 receiving mail. Each policy has an independent scanner history tracker 419, 425, 431 coupled to a scanner driver 409. The scanner driver 409 applies the same ordering algorithm to any information given to it. Thus, if the timer (not shown) for the engineer's policy expires, all data from that policy's scanner history tracker is sent to the scanner driver 409, which processes the data to determine an optimized order for scanning module 413 and scanning module 415. The engineer's policy 411 is then re-ordered according to this sequence. In the same manner, the scanner history tracker 425 for the next policy of office administrators 421 is sent to the scanner driver 409, which applies the same algorithm to determine a scanning order for the administrators 421 policy. Also in the same manner, the scanner history tracker 431 information for the third policy of sales associates 427 is processed by the scanner driver 409, which optimizes the order these scanning modules 413, 415, 429. Each policy may be on its own timer or counter, or every policy may use the same timer or aggregate counter.

Figure 5:
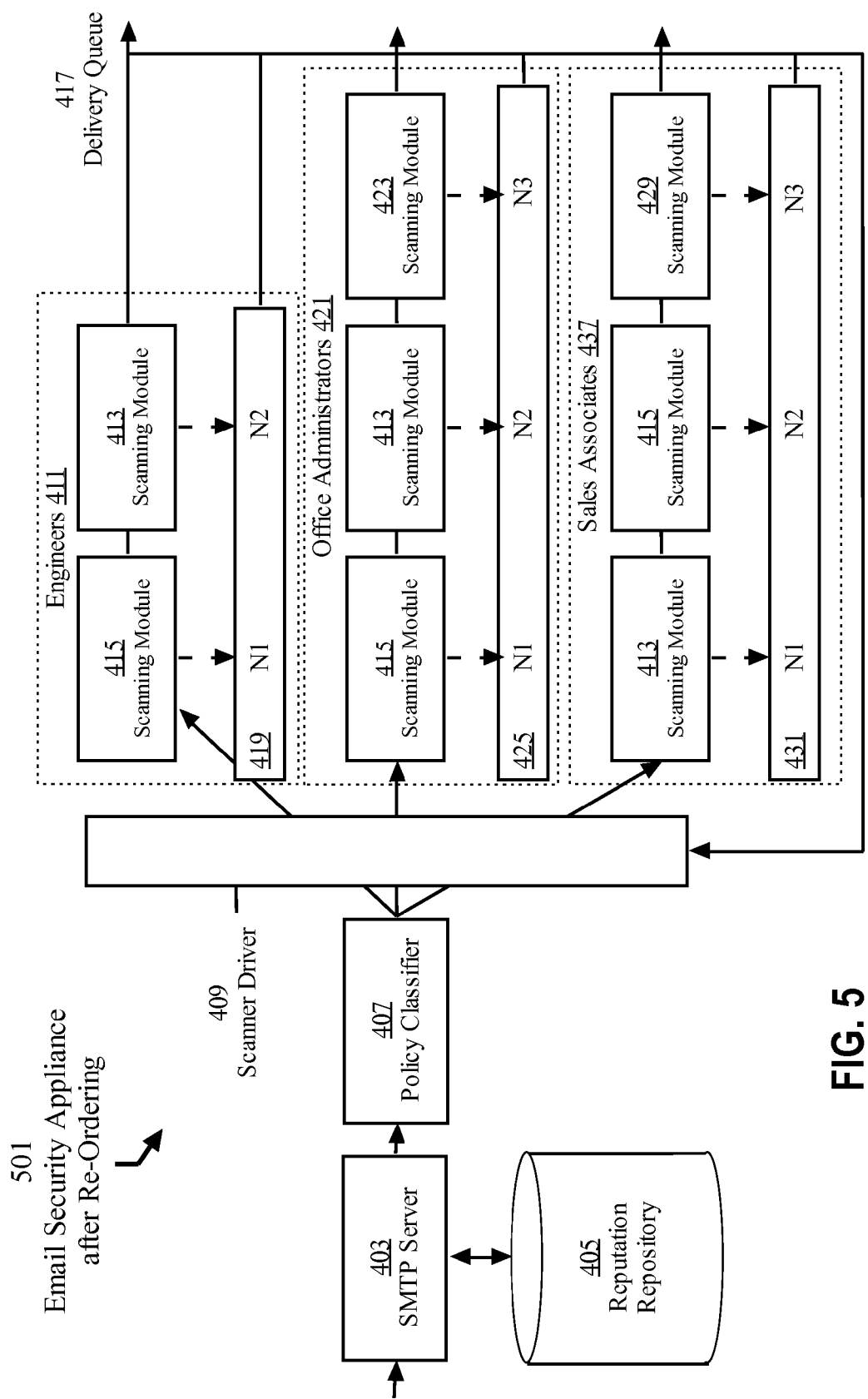
FIG. 5 is a block diagram illustrating an email security appliance gateway system with a scanner history tracker for each policy after a dynamic re-ordering.

FIG. 5 is a block diagram illustrating an email security appliance gateway system with a scanner history tracker 419, 425, 431 for each policy after a dynamic re-ordering. The scanning modules 413, 415, 423, and 429 have been re-ordered under the control of scanner driver 409. Based on the re-ordering for each policy, the scanning modules are placed in different orders that have no association between policies. For example, FIG. 5 illustrates the three policies from FIG. 4 after they have been re-ordered. In this embodiment, both office administrators 421 and sales associates 425 have scanning modules 413 and 415, but scanning module 415 is in front of scanning module 413 in the office administrator 421 policy, while scanning module 413 is in front of scanning module 415 for the sales associate 427 policy.

Policy Inter-Related Layout

Figure 6:
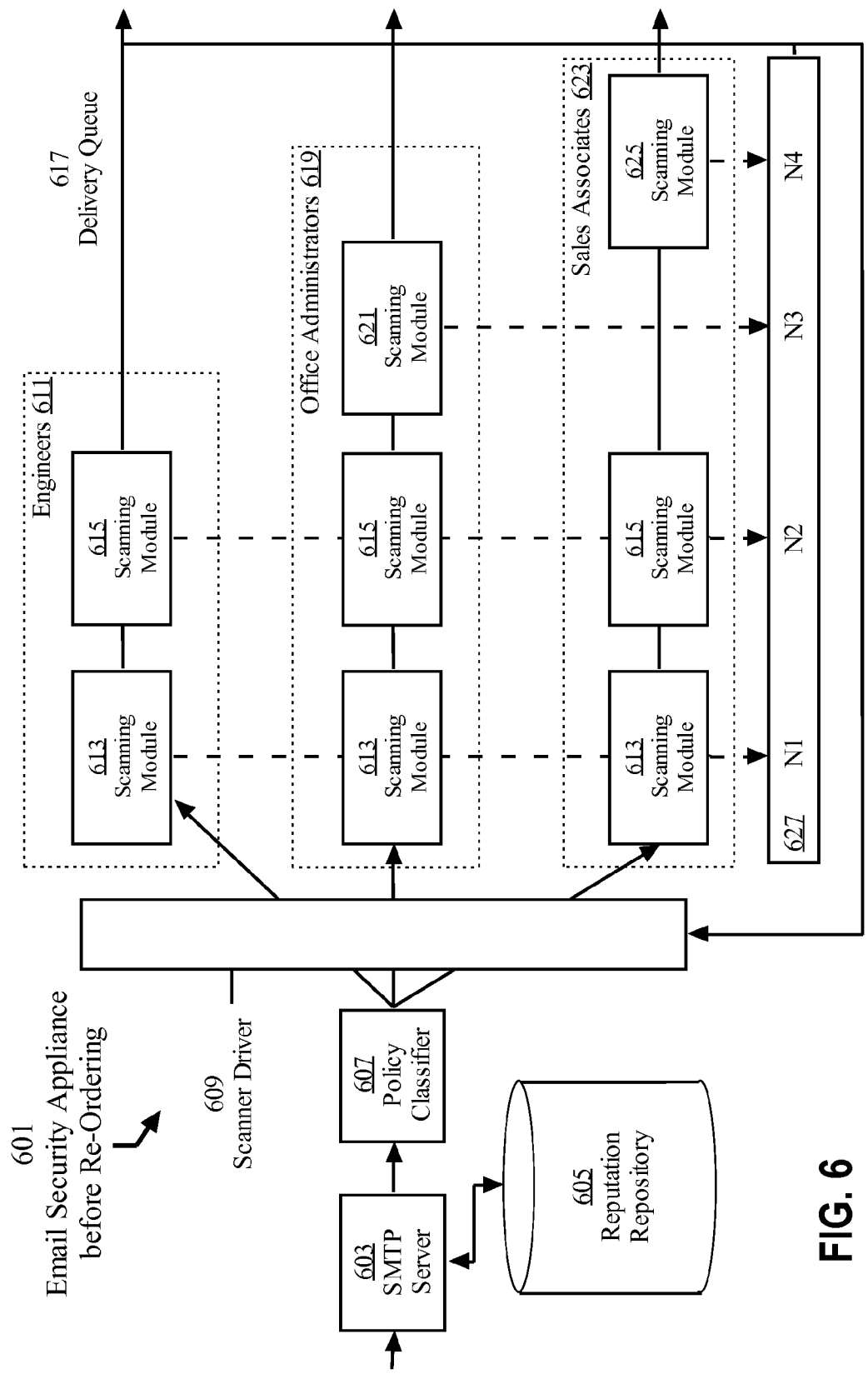
FIG. 6 is a block diagram illustrating an email security appliance gateway system with one scanner history tracker for all policies.

FIG. 6 is a block diagram illustrating an email security appliance gateway system with a scanner history tracker for all policies. The security appliance gateway comprises an SMTP server 603 coupled to a reputation repository 605 and a policy classifier 607. The policy classifier is coupled to a plurality of scanning modules 613, 615, 621, and 625 that are controlled by a scanner driver 609. The scanning modules are grouped in different sets called policies. A policy is defined for engineers 611, office administrators 619, and sales associates 423. The scanning modules in some policies are similar, so a single module pushes information to a single scanner history tracker. For example, scanning module 613 pushes to scanning history tracker 627 when being used in the policy for engineers 711. Scanning module 713 pushes to scanning history tracker 627 when being used in the policy for office administrators 619. Scanning module 613 pushes to scanning history tracker 627 when being used in the policy for sale associates 623.

In some embodiments, the same scanner history tracker is created for all policies. In this manner, the scanner driver independently determines scanner sequence from policy classification, but the order of scanning modules is similar across policies.

For example, FIG. 6 illustrates three policies for scanning email messages: a policy for engineers 611 receiving mail, a policy for office administrators 619 receiving mail, and a policy for sales associates 623 receiving mail. Each policy has the same scanner history tracker 627 coupled to a scanner driver 609. The scanner driver 609 applies the same ordering algorithm to any information given to it. Thus, if the timer (not shown) for all policies expires, all data from that policy's scanner history tracker 627 is sent to the scanner driver 609, which processes the data to determine an ideal order of scanners. The policy for engineers 611, the policy for office administrators, and the policy for sales associates 623 are re-ordered according to the sequence.

Figure 7:
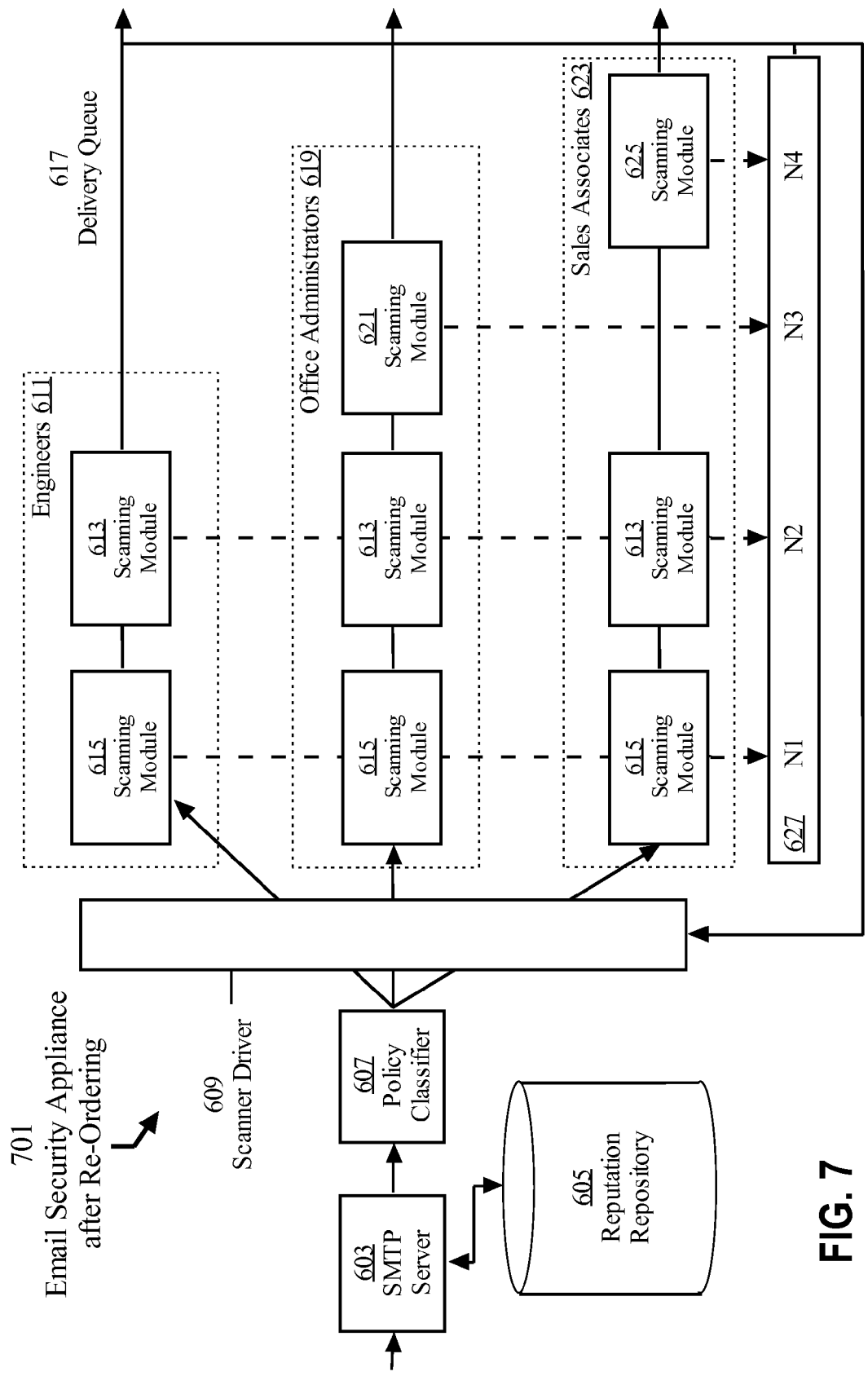
FIG. 7 is a block diagram illustrating an email security appliance gateway system with one scanner history tracker for all policies after a dynamic re-ordering.

FIG. 7 is a block diagram illustrating an email security appliance gateway system with one scanner history tracker for all policies after a dynamic re-ordering. The scanning modules 613, 615, 621, and 625 have been re-ordered under the control of scanner driver 609.

Based on the re-ordering for each policy, the scanning modules are placed in an order that may be similar among the policies. For example, FIG. 7 illustrates the three policies from FIG. 6 after they have been re-ordered. In this embodiment, the policies for engineers 611, office administrators 619, and sales associates 623 have scanning module 615 in front of scanning module 613. However, the policies remain distinct because each policy has a different set of scanning modules defined by the policy.

Email Security Appliance Implementation

Figure 8:
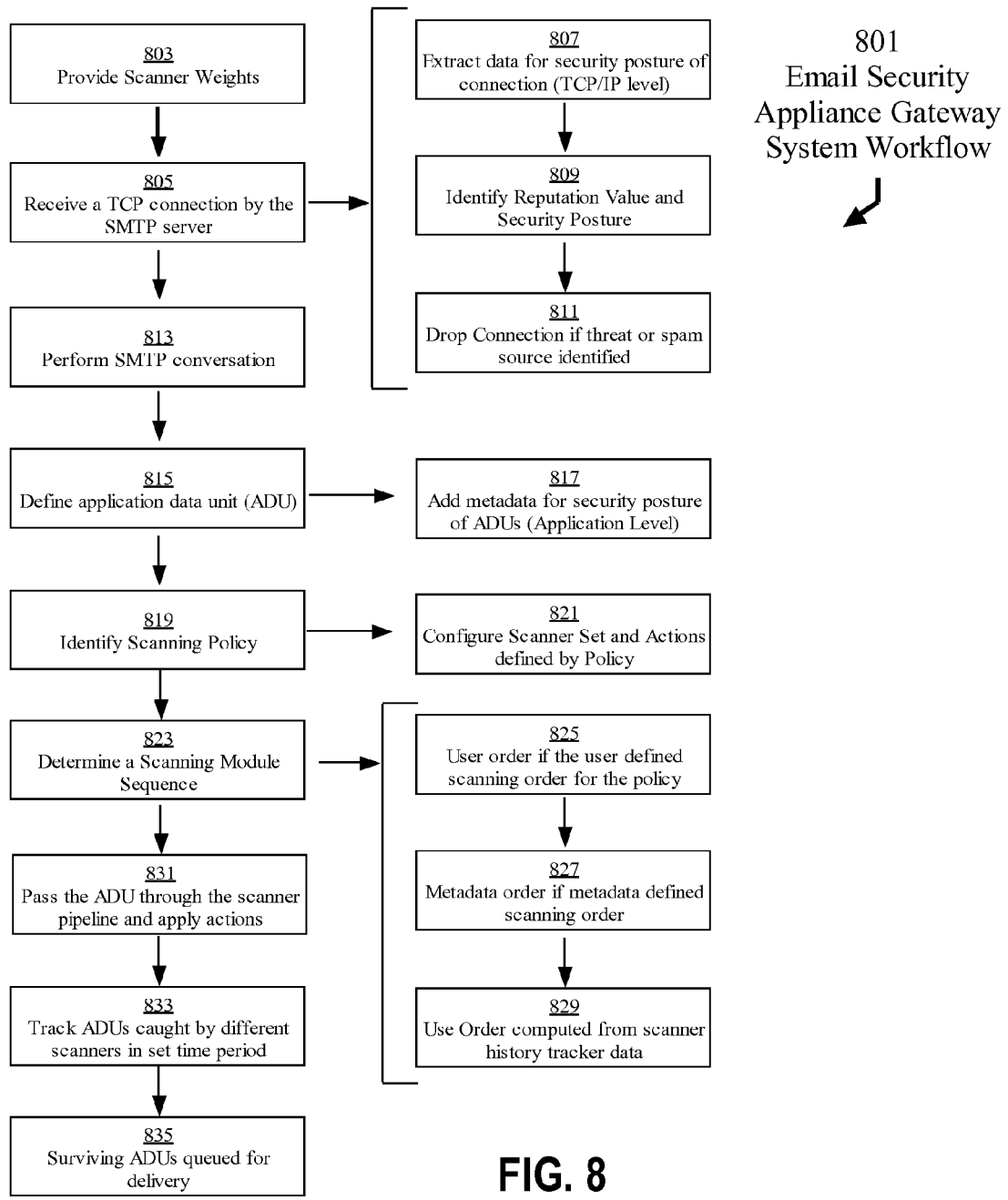
FIG. 8 is a flowchart illustrating a system level workflow for an email security appliance gateway system.

FIG. 8 is a flowchart illustrating a system level workflow for an email security appliance gateway system. Using one or more of the above security email appliance layouts, the dynamic re-ordering methodology of the scanner driver and scanner history tracker are integrated as part of a larger system workflow. For example, in FIG. 8 a system workflow for an email security appliance starts at block 803 with providing scanner weights associated with scanning execution time. These scanner weights may be automatically calculated under a cost ratio analysis as hereinafter described. In a preferred embodiment, the scanner weights are provided by the system designers.

After these initial steps, a TCP connection is received at block 805 by the SMTP server. At block 807. The SMTP server extracts information such as IP address, sender and receiver email address, and sender and receiver domain from the incoming connection that are useful in identifying a security posture for this connection. At block 809, this information is then used to identify a reputation value and security posture by comparing the data with an external reputation repository. If the reputation value, or the security posture in general, retrieved from the repository indicates that the connection is a threat or spam, the connection is immediately dropped as noted at block 811.

After establishing a reliable connection between the message sender (SMTP client) and message receiver (SMTP server), the SMTP server performs the mechanics of the SMTP conversation and accepts the message at block 813. At this point, the message is defined at block 815 as an application data unit (ADU), which may include additional packaging data. For example, security posture metadata is added at block 817 to the ADU based on connection information (such as an IP address) and sender and receiver reputations retrieved from an external repository.

At block 819, the ADU is then sent to policy classifier (PC) that identifies the policy to which ADU is mapped. In some embodiments, policies are associated with sender and recipient information. In some embodiments, additional override policies may be defined based on security posture metadata. Each policy comprises of a set of scanners and an action to be applied based on the scanner result. Thus, once a policy is identified, the scanners are configured 821 to forward the application data unit through the set, and apply the specified actions.

For the first period of ADUs received, the scanning sequence order is defined as the initial scanning sequence created under factory default settings. For the subsequent periods, scanning sequence order is determined at block 823 by the scanner driver based on a hierarchy of rules:

a. If a user has defined a scanning order sequence for the policy identified by the policy classifier, that user sequence has priority over any other sequence as presented in block 825.

b. If the ADU has metadata that defines a scanning order, that metadata sequence has priority over the scanner driver computed sequence as presented in block 827.

c. If the ADU does not have any override data and a user has not define a user sequence for this ADU's policy, the scanner driver uses a scanning module sequence computed by processing data from the scanner history tracker as presented in block 829.

In alternative embodiments, the scanner driver computed sequence has priority over the metadata sequence. If the user has not defined a user sequence (a) and the scanner driver has not computed a scanning module sequence (c), then the metadata sequence (b) is used to process ADUs. The scanner driver may have priority over a metadata sequence as a default or as the result of a trigger. These triggers include, but are not limited to, a certain amount of traffic, the scanner driver being enabled by a user, a specific detection of a pattern of ADUs being blocked, or any combination thereof.

An ADU is passed at block 831 through the scanner pipeline by each module receiving the ADU, scanning it, and forwarding the ADU on to the next scanning module, until it reaches the end of the pipeline associated with its policy. At block 833, the scanner history tracker tracks the ADUs blocked by different scanners in periodic intervals. The scanner driver then uses this information at block 829 to suggest a policy specific scanning order (FIG. 4) or a policy inter-related scanning order (FIG. 6). If the ADU survives, it is queued at block 835 for delivery. The process 801, then repeats as necessary. For further messages received through the same connection, the process may repeat from block 813. For additional connections, the process may repeat from block 805. When a new scanner weights are added to the system, the process may repeat from block 803.

Application Level Scanning

In a preferred embodiment, the scanning modules 111, 113, 115, 117 operate on application level data units, where the data units are passed through the pipeline in a steady state. The application data units may be variable in size, but the steady state flow rate causes a relatively consistent amount of application data units to be scanned before the next scanning period. Thus, scanning rates recorded by the scanning history tracker 119 are less affected by changes in amounts of data scanned for a given period. Here, the optimal recording period for the scanning history tracker 119 may be a period of time or a number processing cycles.

In some embodiments, non-steady state flow of application level data units is expected. For example, when files are rarely transferred over an instant message service, the units blocked may occur sporadically. The application data units may be variable in size and variable in amount for a given time period. Thus, scanning rates recorded are less likely to show patterns periodically, and more likely to show patterns sporadically. Here, the recording period for the scanning history tracker 119 may be a number of application data units blocked by all scanning modules or the number of application data units received by the gateway system in general.

Packet Level Scanning

In some embodiments, scanning modules 111, 113, 115, 117 operate on a packet level. Because the scanning history tracker 119 is recording packets that are blocked without actually looking at the content of this data, the scanner driver operates in the same manner as if it were ordering scanning modules for ADUs. The scanner history tracker 119 records the number of packets blocked for a given period, and the scanner driver computes a sequence for the scanning modules. In these embodiments, the packets may have to wait in a queue at the end of the scanning sequence, so the entire collection of packets can be kept or dropped before a delivery interface forwards the data on to a network destination. For example, in step 215, if the data unit was processed at a packet level instead of the application level, the queue may be used to reconstruct packets into an application data unit.

Scanning Module Overlap

In some embodiments, a pipeline may comprise multiple scanning modules of the same type. In such situations, the system reorders the engines to "bubble up" the engine with the best efficacy/efficiency ratio. For example, if a pipeline comprises two or more anti-virus scanning modules, the anti-virus scanning module with the highest block rate is placed before the scanning modules with similar anti-virus scanning properties. This order may be further used to craft more efficient policies, to identify aggressive scanning modules, or to identify specific types of ADU's that are blocked by one module but not by another module, even though their overall purpose overlaps.

Scanner Driver Sorting Logic

When N units of data are passed through a sequence of scanning modules, $N_1+N_2+N_3+\ldots+N_n$ units are stopped by the respective scanning modules, Scanning Module 1, Scanning Module 2, Scanning Module 3, and Scanning Module n. It follows that the rest of the data units that are scanned by a module and not blocked are considered clean or $N_e$. So, for a given period, a total of N units pass through a security threat pipeline such that $$N=N_1+N_2+N_3+\ldots+N_n+N_C, \qquad \text{eq. 1}$$

where Ni is the number of units of data blocked by a scanner 'i' over a period.

In some embodiments, the re-ordering algorithm applied by the scanner driver is designed to minimize total effort of the system. "Total effort" represents the total cost of scanning all data units as they were scanned in a period. The cost $C_j$ of one data unit going through scanner 'j' may be calculated as a number of cycles, a throughput, or an amount time. Adding this additional parameter into the system gives the equation:

$$TE=\Sigma_{i=1}^{n}(Ni*\Sigma_{j=1}^{j=1}C_j)+Nc*\Sigma_{k=1}^{n}C_k, \qquad \text{eq. 2}$$

where n is the total number scanners, N is the number of units blocked by a specific scanner, C is the cost of a specific scanner, and $N_c$ is the number of clean units. In some embodiments, the $N_c$ term may be set to zero because this factor is not affected by a re-ordering.

In a preferred embodiment, the re-ordering algorithm applied by the scanner driver is designed to minimize wasted effort. "Wasted effort" represents the total cost of scanning data units that could have been saved if the system only scanned a blocked data unit with the module necessary to block that data unit. Removing, the non-wasted scanner from the TE equation gives the equation:

$$WE=\Sigma_{i=2}^{n}(Ni*\Sigma_{j=1}^{j=i-1}Cj), \qquad \text{eq. 3}$$

where n is the total number scanners, N is the number of units blocked by a specific scanner, and C is the cost of a specific scanner. An expanded form of this equation for a system of four scanning modules would break down as follows:

$$WE=N_2*C_1+N_3*(C_1+C_2)+N_4*(C_1+C_2+C_3) \qquad \text{eq. 4}$$

In some embodiments, cost C may be generalized as a ratio of cost of one scanning module compared to all scanning modules such that the summation of all $C_j$ equals one. In some embodiments, cost C may be generalized as a ratio of the cost of one scanning module compared to the cost of the highest cost scanning module such that the highest cost scanning module has a cost of one and the other scanning modules have a weighted cost between zero and one. In either embodiment, a high ratio represents a high cost of scanning with respect to other scanning modules.

From the previous equations, the scanning module that is placed first has a cost $C_1$ that all data units N must bear. Therefore, the system will benefit if $C_1$ is minimized. Also, from the previous equations, the scanning module that is placed first has a number of data units scanned $N_1$ that are not calculated as wasted effort in the wasted effort equation. Therefore, the system will benefit most if this variable is maximize. Using both heuristics, the scanning module with the most units blocked at the least cost should be the most efficient scanning module. Thus, the following computation may be sorted in decreasing order to determine the most efficient order of scanning modules by the scanner driver.

$$N_1/C_1, N_2/C_2, N_3/C_3, \ldots, N_n/C_n \qquad \text{eq. 5}$$

The scanning modules are sorted with their associated metrics such that the module with the highest block rate is placed first in the scanning sequence, the module with the second highest block rate is placed second, and so on. In this manner, wasted effort is minimized and the work performed by all scanning modules in sum is reduced.

Sorting may be accomplished through any number of sorting algorithms both complete sorts and not complete sorts, including but not limited to, quicksort, merge sort, in-place merge sort, heap sort, insertion sort, introsort, selection sort, timsort, shell sort, bubble sort, binary tree sort, cycle sort, library sort, patience sorting, smoothsort, strand sort, tournament sort, cocktail sort, comb sort, gnome sort, unshuffled sort, Franceschini's method, block sort, bogosort, pigeonhole sort, bucket sort, counting sort, LSD radix sort, MSD radix sort, spread sort, bread sort, simple pancake sort, and spaghetti sort. A preferred embodiment uses a sort with an average Big O of O(n log(n)).

FIG. 9 is a flowchart illustrating the scanner driver's logic in determining a scanning module order. The scanner driver using this logic 901 receives data from the scanner history tracker configured to record units blocked over a set period of time for three scanning modules. As presented in FIG. 9, the three scanning modules scan a set number of one or more application data units to identify the time required by each for a single scan. Scanner A takes 100 milliseconds, Scanner B takes 20 milliseconds, and Scanner C takes 80 milliseconds for total scan time of 200 milliseconds to complete a single scan. The cost ratio of each scanning modules is then computed 903 by comparing the cost of a single module's scan with the cost of all modules scanned. At 100 ms/200 ms Scanner A takes 50% of the cost of a pipeline scan; at 20 ms/200 ms Scanner B takes 10% the cost of a pipeline scan; and at 80 ms/200 ms Scanner C takes 40% of a pipeline scan. The scanner history tracker then records 905 units blocked over a first period. Over the first period, Scanner A has blocked 328 application data units (ADUs); Scanner B has blocked 91 ADUs; and Scanner C has blocked 21 units. Then the units blocked are divided by the scanner cost ratio to determine 907 a scanning module block rate for each scanning module as if a single scanning module were the only scanning module in the security threat pipeline for that period. Using this equation (eq. 5), Scanner A has a block rate of 656 ADUs blocked/period, Scanner B has a block rate of 910 ADUs blocked/period, and Scanner C has a block rate of 52.5 ADUs blocked/period. Finally, the scanner driver sorts 909 the scanning modules based on these block rates. Scanner B at 910 ADUs blocked/period is placed in front of Scanner A at 656 ADUs blocked/period, which is place in front of Scanner C at 52.5 ADUs blocked/period.

Modified Scanning Module Weights

In many embodiments, this sorting algorithm takes account of the run time execution associated with the individual scanning modules because N1 through Nn are associated with a rate (number of units blocked for a period) and not simply the number of units blocked by themselves. Additionally, run time execution is built into the cost ratio C1 through Cn based on the cost being associated with the run time required to execute a single scan across the pipeline. Thus, if a specific scanning module has a longer run time than other scanning modules, this variable will be taken into account because the rate (Ni) and the ratio (Cj) have an element of time included in the parameter.

However, in some embodiments, there are additional factors that need to be taken into account. For example, if N is calculated as a number of units blocked over a period, wherein the period is an aggregate number of total units to be received by the gateway rather than time, and cost is associated with a widely varying cost on average of each scanning module rather than a cost associated with a constant throughput, then run time may not be effectively taken into account. For these embodiments, a specified weight may be used in the calculation to account for the additional metrics.

$$N_1/(W_1), N_2/(W_2), N_3/(W_3), \ldots, N_n/(W_n) \qquad \text{eq. 6}$$

These weights may be calculated based on a system policy by sending a benchmark group of units through single scanning modules. In a preferred embodiment these weights are defined manually by system designers. However, users, administrators, external security organizations, or other entities may be granted access to configuring these weights. In addition to being tied to a particular scanning module, weights may also be specific to particular policies, application data unit types, protocol type, or the size of a file being scanned.

In some embodiments, these weights are added as metadata to application data units before entering a policy classifier.

Scanner Driver Effort Calculations

Wasted effort depends on the sequence of scanning modules and the traffic profile. For a given traffic profile, wasted effort could be different for different sequences of scanning modules. The objective of a dynamic reordering method is to minimize the wasted effort based on the already observed wasted efforts of the previous traffic patterns. In some embodiments, total effort or wasted effort calculations are used to confirm benefits associated with dynamic sorting. If, for example, a DDoS attack has been designed to specifically target a dynamic ordering gateway system, a wasted effort comparison calculation may be used to revert the scanning modules to a static scanning order.

Continuing the example from FIG. 9, assume that the units blocked rate from FIG. 9 are used to define the scanning order in FIG. 10. FIG. 10 is a flowchart illustrating steps for performing effort calculations for a dynamically ordered threat detection pipeline. Such steps may be used as feedback for the performance benefits of dynamic re-ordering. If the performance benefits do not outweigh the cost of the additional driver computations, the dynamic re-ordering system may be temporarily put on hold.

Wasted effort calculations 1001 are used to calculate the wasted effort from scanning sequence B, A, C, and compare this to the static scanning sequence A, B, C. The units blocked in the second period are recorded 1003 by the scanner history tracker as 95 units for Scanner B, 413 units for Scanner A, and 18 units by scanner C. This means 1005 that 18 units went through scanning by Scanner B, Scanner A, and Scanner C; 413 units went through scanning by Scanner B and Scanner A; and 95 units went through scanning by Scanner B. In terms of total necessary effort 1007, this is as if 276 units passed through the entire pipeline. Using wasted effort alone 1009, this is as if 104 units passed through the entire pipeline that were not forwarded to their final destination.

FIG. 11 is a flowchart illustrating steps for performing an effort calculation for a statically ordered threat detection pipeline. As a comparison the same calculations are performed for the static scanning order A, B, C. Continuing the example from FIG. 10, assume that the units blocked rate from FIG. 9 are not used to define the scanning order in FIG. 11. Wasted effort calculations 1101 are then used to calculate the wasted effort from scanning sequence A, B, C. The units blocked in the second period are re-ordered 1103 as if the scanning modules blocked the same units but in a different order. This means 1105 that 18 units went through scanning by Scanner A, Scanner B, and Scanner C; 95 units went through scanning by Scanner A and Scanner B; and 413 units went through scanning by Scanner A. In terms of total effort 1107, this is as if 282 units passed through the entire pipeline. Using wasted effort alone 1109, this is as if 282 units passed through the entire pipeline that were not forwarded to their final destination.

The units blocked by a particular scanning module Nn can only be increased by placing that scanning module earlier in the scanning order. Thus, this calculation may be slightly inaccurate because ADUs that have multiple reasons to be blocked (both spam and viruses) would have been blocked by a scanning module earlier in the static sequence. However, because the most efficient scanning module is placed in the front of the scanning order, this makes the comparison calculations more conservative rather than unreliable.

Comparing the calculations from FIGS. 10 and 11, the total effort is minimized by the dynamic scanning order and the wasted effort is also minimized by the dynamic scanning order. The total effort 1007 of the dynamic sequence is 276 units passing through the entire pipeline as calculated in FIG. 10 which is less than the total effort 1107 of 282 units passing through the entire static pipeline calculated in FIG. 11. Similarly, the wasted effort of the dynamic sequence 1009 is 104 units passing through the entire pipeline as calculated in FIG. 10 which is less than the wasted effort 1109 of 116 units passing through the entire static pipeline calculated in FIG. 11.

Static Vs Dynamically Ordered Modules Comparison

Static sequences associated with high wasted effort calculations, generally indicate an exceptional benefit when a scanner driver is added to the system. Based on a variety of simulations, a reduction in wasted effort varies from as low as 2% to nearly as high as 70%. Even in the 2% reduction in wasted effort, the dynamic ordering is perform efficiently. However, for that data set, the static ordering was already in a close to ideal sequence. The benefit of dynamic re-ordering outweighs the cost of calculating whether the modules should be re-ordered even in these 2% scenarios, where the Big O associated with the re-ordering calculation is relatively small: O(n log(n)), for 'n' scanners.

FIG. 12 comprises a chart used as an example for comparing a statically ordered threat detection pipeline with a dynamically ordered threat detection pipeline. In some embodiments, a scanner driver may produce a printout of static wasted effort calculations compared to the wasted effort calculations of a dynamic ordering system. These printouts may additionally indicate the number of sequence re-orderings for a given number of periods.

For example, FIG. 12 presents the results of passing a series of different block rates for consecutive periods through the dynamic reordering algorithm explained in FIGS. 9, 10, and 11. Thirteen periods that resulted in re-ordering are shown in bold. Note that a block rate calculation that results in a re-ordering at line 'n' causes reordering at the next period, line 'n+1.' For example, the data from FIG. 9, shown in bold at line 2, caused the re-ordering of the data from FIG. 10, shown in line 3.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
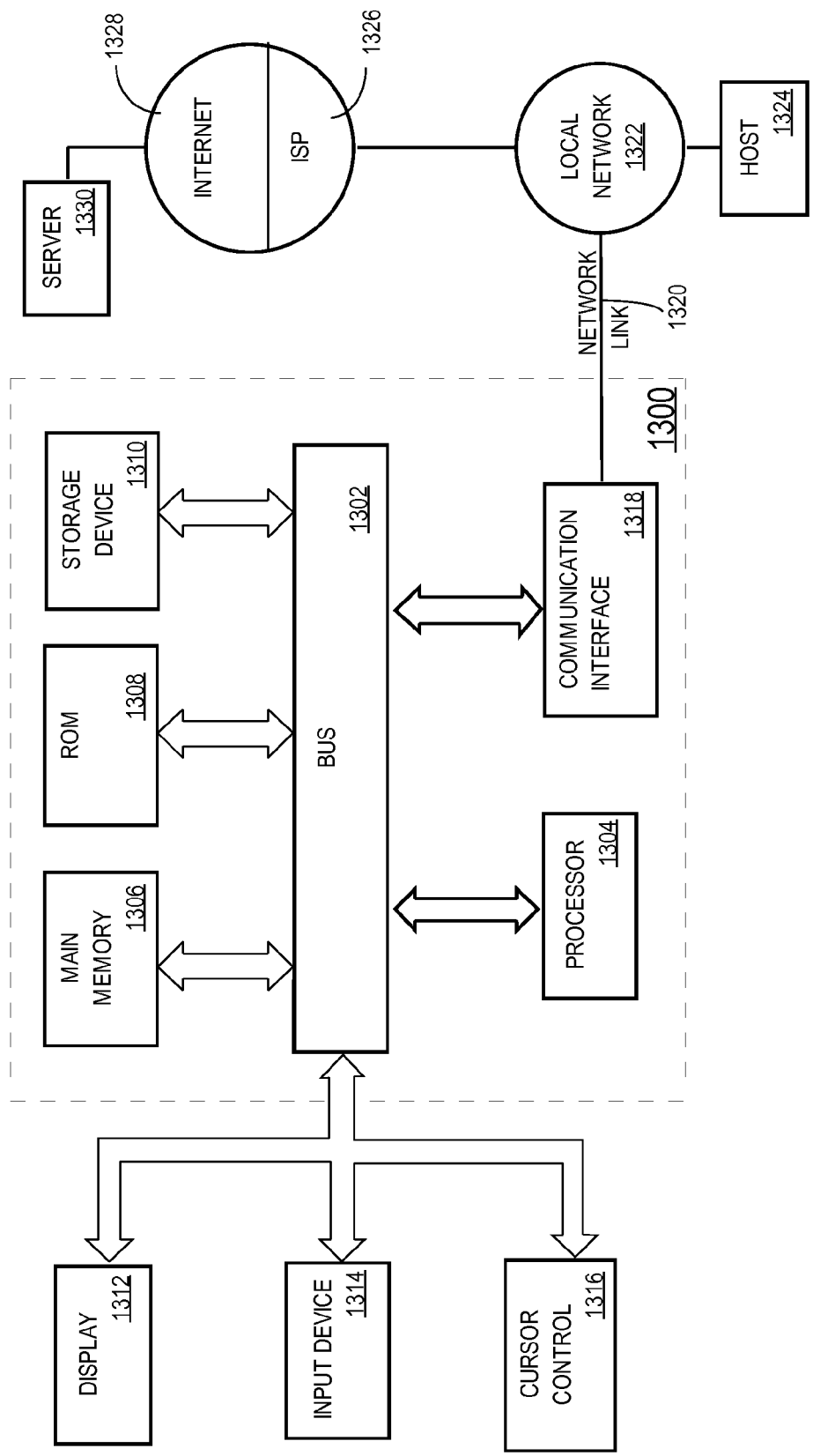
FIG. 13 is block diagram illustrating a computer system that may be used to implement the techniques described herein.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or solid-state drive is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method comprising:
   using a security gateway, filtering application level data units by routing network traffic through a plurality of scanning modules in a sequence;
   using a scanner history tracker, computing a block rate for each module by tracking, over a period, which units are received by each module in a set of scanning modules and not forwarded toward a destination specified in those units;
   using a scanner driver, automatically re-ordering the sequence in which units are scanned by the scanning modules based on the block rate to preserve bandwidth of the security gateway by dynamically placing a module with a highest ratio of block rate to run-time cost before other modules in the set of scanning modules such that a most effective scanning module blocks data units before scanning is wasted on those data units by other modules;
   wherein the data processing method is performed by one or more computing devices.

2. The data processing method of claim 1, wherein the scanning modules are selected from a group consisting of an antivirus module, an anti-spyware module, a file blocking module, an anti-spam module, an anti-phishing module, a URL filtering module, and a content filtering module.

3. The data processing method of claim 1, comprising performing the tracking only periodically for a set period of time.

4. The data processing method of claim 1, comprising performing the tracking only periodically for a set number of units.

5. The data processing method of claim 4, comprising performing the tracking only periodically for a set number of units scanned and not forwarded toward the destination specified in those units.

6. The data processing method of claim 1, wherein the run-time cost for each module further comprises computing a weight value associated with a scanning efficiency for each module, wherein the scanning efficiency comprises a ratio of a number of cycles needed to perform a scan by a module compared to a highest number of cycles needed to perform a scan by one module.

7. The data processing method of claim 6, wherein the re-ordering is based on the block rate for each module, and comprising determining the block rate for a particular module by dividing the units that are received but not forwarded by the particular module by the weight value of that particular module.

8. The data processing method of claim 1, wherein the re-ordering the sequence comprises the module with the highest block rate placed before a second module with a second highest block rate.

9. A method comprising:
   using an application level firewall, receiving a first unit of data associated with a set of scanning modules based on a sender and receiver of the first unit of data; wherein the first unit of data is routed through the set of scanning modules in a first sequence;

using a scanner history tracker, in response to a scanning module of the application level firewall discarding the first unit, storing in a record which module in the first sequence discarded the first unit;

using the application level firewall, receiving a second unit of data associated with the set of scanning modules based on a sender and receiver of the second unit of data; wherein the second unit of data is routed through the set of scanning modules in the first sequence;

using the scanner history tracker, in response to a scanning module of the application level firewall discarding the second unit, storing in the record which module in the first sequence discarded the second unit;

based on the record, re-ordering the first sequence of modules to preserve bandwidth of the application level firewall by dynamically placing a module with a highest ratio of block rate to run-time cost before other modules in the set of scanning modules such that a most effective scanning module blocks data units before scanning is wasted on those data units by other modules;

wherein the method is performed by one or more computing devices.

10. The method of claim 9, further comprising resetting the record after the re-ordering.

11. The method of claim 9, comprising performing the re-ordering only periodically after receiving a set number of units.

12. The method of claim 9, comprising performing the re-ordering only periodically after a set number of cycles.

13. The method of claim 9, comprising performing the re-ordering only periodically after a set amount of time.

14. The method of claim 9, wherein each module is associated with a number of cycles needed to perform a scanning operation on a constant number of one or more units; wherein the re-ordering the first sequence is based on the record and the number of cycles needed to perform the scanning operation on the constant number of one or more units.

15. The method of claim 9, wherein each module is associated with a specified weight value; wherein re-ordering the first sequence of modules is based on the record and the specified weight value.

16. The method of claim 9, further comprising determining the set of scanning modules among all modules available defined by a security policy; wherein each policy is associated with routing the unit of data through a least number of modules possible to preserve bandwidth through the firewall.

17. The method of claim 16, wherein determining the set of scanning modules comprises determining a reputation value associated with a sender and an address of the sender.

18. The method of claim 17, comprising storing a different record for each set of scanning modules that is defined by the security policy.

19. A data processing apparatus comprising:
a security gateway computer that filters traffic of application level data units by routing network traffic through a plurality of scanning modules before forwarding the units to a destination specified by the units;
wherein at least some units are received by at least one module in a set of scanning modules over a data communication network and not forwarded toward the destination specified in those units; the security gateway further comprising:
a scanner history tracker to compute a block rate for each module by tracking, over a period, which units are received by each module in the set and not forwarded toward the destination specified in those units;
a scanner driver for dynamically ordering a sequence in which units are scanned by the scanning modules based on the block rate to preserve bandwidth of the security gateway by dynamically placing a module with a highest ratio of block rate to run-time cost before other modules in the set of scanning modules such that a most effective scanning module blocks data units before scanning is wasted on those data units by other modules.

20. The apparatus of claim 19, wherein the scanning modules are selected from a group consisting of an antivirus module, an anti-spyware module, a file blocking module, an anti-spam module, an anti-phishing module, a URL filtering module, and a content filtering module.

* * * * *